May 2, 1967 L. B. WILNER ET AL 3,316,990
ANIMAL ISOLATOR WITH WEIGHING SYSTEM
Filed March 16, 1965 4 Sheets-Sheet 1

INVENTORS
LESLIE BRUCE WILNER
BERNARD A. SHOOR
BY
Kane, Dalsimer & Kane
ATTORNEYS INVENTORS
LESLIE BRUCE WILNER
BERNARD A. SHOOR
BY
Kane, Dalsimer & Kane
ATTORNEYS May 2, 1967 L. B. WILNER ET AL 3,316,990
ANIMAL ISOLATOR WITH WEIGHING SYSTEM
Filed March 16, 1965 4 Sheets-Sheet 3

INVENTORS
LESLIE BRUCE WILNER
BERNARD A. SHOOR
BY
Kane, Dalsimer & Kane
ATTORNEYS

United States Patent Office 3,316,990
Patented May 2, 1967

3,316,990
ANIMAL ISOLATOR WITH WEIGHING SYSTEM
Leslie Bruce Wilner, Palo Alto, and Bernard A. Shoor, Menlo Park, Calif., assignors, by mesne assignments, to Becton Dickinson and Company, East Rutherford, N.J., a corporation of New Jersey
Filed Mar. 16, 1965, Ser. No. 440,207
18 Claims. (Cl. 177—132)

The present invention relates generally to a precision, remote reading, weighing system for animal isolators, and more particularly to a weighing system forming an integrated part of a disposable isolator for maintaining controlled environmental conditions for animals, organisms or the like and a system capable of weighing within the enclosure and reading the registered weight exteriorly of the enclosure.

The maintenance of controlled environmental conditions for animals by means of a glove-type isolator has become increasingly popular. Contributing to this success and demand is the manner in which precise control of small groups of animals is permitted. Should accidental contamination occur, losses are minimized. These isolators are now being manufactured of materials and at costs favoring disposability. This attribute is preferred for many experiments and is particularly suited to short-term studies running for days or weeks. Complex labor-consuming details of sterilization or autoclaving isolators for reuse are eliminated. When a study is completed and animals sacrificed, the isolator may be discarded along with the mice. They are disposable by autoclaving or incineration.

In the ordinary day-to-day usage of the disposable glove-type isolator, the housed animals, when particularly of the laboratory and experimental variety, are periodically weighed to detect weight changes under certain conditions or incident to prescribed treatment or experimentation. Extracted parts or organs of such animals obtained through surgery or otherwise may also require weighing.

Heretofore, weighing in a disposable glove-type isolator was simply not possible, primarily because of the absence of enough interior space to accommodate a scale. If enough space were available, known scales could not be efficiently or practically executed.

Time-consuming transfer techniques, which are far from reliable and safe because of the ever dangerous contamination potential, would be required to introduce scales interiorly of the enclosure from without. The same problem would be present when removing the scale following each weighing operation. When the isolator approached the size and capacity of the jacket-type isolator, a scale would ordinarily be placed in the isolator in the first instance, and kept there as a fixture until the usefulness of the isolator expired and the isolator was required to be discarded.

It is therefore a primary object of this invention to eliminate the aforenoted inadequacies of the prior art and provide an improved disposable glove-type isolator with an integrated weighing device, portions of which are also discardable along with the isolator.

Another object is to provide a controlled environmental glove-type isolator for animals employing an accurate force measurement weighing system for registering weights of bodies within the enclosure.

A further object is to provide a weight head insert as an integral part of enclosures of this general type and to which a reusable load cell of a permanent-type of readout mechanism is adapted to be detachably associated thereby rendering it possible to employ a minimum number of such mechanisms for a relatively large number of enclosures bearing weigh head inserts.

Still another object is to provide a weighing system for enclosures whereby a force is transmited through the enclosure surface for generating a proportionate electrical signal discernable by a readout.

Thus, the present invention envisions as a particular embodiment, a glove-type isolator which is of a disposable nature and capable of maintainig within a controlled environment. A weighing head insert is incorporated as an integral part of the isolator and is of a construction that will assure and maintain the selected and desired controlled environment within the isolator. This insert serves to transmit a tensile force through the wall or skin of the enclosure incident to the weighing operation. Adapted to be suspended from the insert within the isolator is a weighing pan or harness for receiving the animal or object to be weighed. In addition, it is contemplated that this harness may be replaced with one peculiarly adapted to hold for weighing, smaller bodies such as parts or organs of a particular animal. Both of these harnesses may be contained in the isolator if desired.

A load cell which may be of the bonded piezo resistance strain gauge transducer variety, is adapted to be detachably coupled with the disposable weight head insert in such a manner to act as a unit therewith in mechanically sensing the weight of the object in the suspended harness by receiving the transmitted tensile force. This force movement or measuredment is translated into an intelligible electrical signal having a value proportional to the weight. The generated signal is then transmitted to a scale readout capable of registering and recording the weight.

When desired, the load cell and connected readout need only be detached and coupled with another weight head insert; or it may be detached at such time as it is desired to discard the isolator.

Other objects and advantages will become apparent from the following detailed description which is to be read in conjunction with the accompanying drawings illustrating an exemplary and somewhat preferred embodiment of the invention in which.

Figure 7:
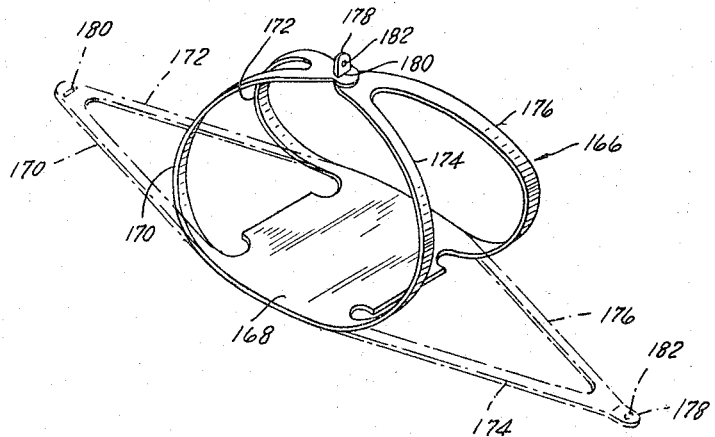
Figure 8:
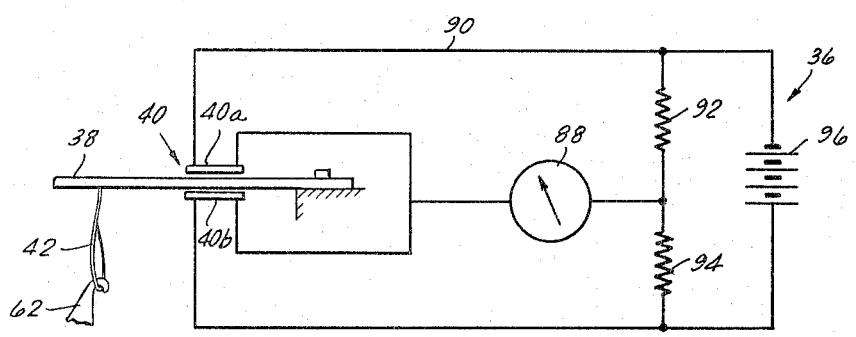

FIG. 7 is another form of harness also of stamped formation but consisting of a single part having utility in weighing of smaller objects in the isolator such as parts and organs of the contained animals; and FIG. 8 is a schematic and diagrammatic view of representative circuitry capable of receiving the tensile force movement and through the disclosed transducer, translating this movement into an electrical signal adapted to be applied to a readout for indicating the registered weight.

In the drawings, a disposable controlled environmental glove isolator 10 has operatively associated therewith, a precision remote reading weighing system 12 pursuant to this invention. The isolator 10 may be of the type having a molded lower base tray 14 and hermetically joined collapsible transparent canopy 16. A contemplated isolator 10 is offered commercially under the name Isolab by Bioquest, a Division of Becton Dickinson and Company, Hackensack, New Jersey. This particular isolator is pre-sterilized and designed specifically for the rearing, study and transport of germ-free animals, such as mice or animals subjected to other controlled environmental conditions. In addition, this isolator 10 includes living space adequate for 7 to 20 mice depending upon size and age. The tray 14, has a self-contained air filter system based on the diffusion principle and is subdivided into a housing compartment of isolation chambers with removable partitions, and storage space for food, bedding, instruments. The canopy is held in an elevated erect position by means of a pair of hinged or pivotal wire frames 18 and 20. A pair of gloves 22 and 24 form part of the canopy for handling the animals and materials within the enclosure while maintaining sterility and preventing contamination of the enclosed environment. A port assembly 26 is also present as part of the canopy for transfer of procedures into and out of the isolator in accordance with accepted and standardized techniques. In this manner, entry of sterilized materials is possible.

Reference is now made to the weighing system 12 wherein a discardable weighing harness 28 is disposed with the isolator 10 and suspended from a discardable weigh head insert 30 forming an integral part of the canopy 16.

A highly accurate load cell 32 is detachably connected with the weigh head insert 30 and through a jack 34 is adapted to transmit an electrical signal to a readout 36 for indicating or recording the registered weight.

A force movement weighing system may be adopted by this invention in which the load cell 32 includes a deflection cantilevered beam 38 and bonded piezo resistance strain gauge transducer 40. The proportionate beam deflection incident to weighing in the harness is transmitted through the weigh head insert 30. This insert is mechanically connected in a manner to be described shortly by a loop 42 suitably connected with the free end of the beam 38.

The insert 30, therefore, serves as an integral part of the canopy 16 by cooperating to maintain the desired controlled environment and also serves the detachable mechanical interconnection between the externally mounted load cell 32 and internal harness 28. Towards this end the insert 30 rests on a support 44 extending between frames 18 and 20. The support may also be of wire stock and of the pattern shown while being detachably associated with the frames 18 and 20 to enable the canopy 16 to be collapsed. The insert 30 comprises a base 46 having a lower bar 48 having a central opening 50 through which the lower end 52 of hook 54 extends for hooking on to the top of harness 28. A raised annular shoulder 56 extends outwardly from the bar 48 and is adapted to have hermetically sealed thereto, the circumferentially extending periphery of a relatively soft, corrugated and flexible film or diaphragm 58. This diaphragm is provided with a central opening 60 through which extends the upper end 62 of hook 54 which engages with the loop 42. In this connection, the hook 54 and diaphragm 58 are hermetically sealed to one another. A laterally extending annular flange 64 on the base 46 is hermetically sealed to the canopy 16 which also has sealed thereto the lateral annular flange 66 of the insert top 68. The top 68 has a central opening 70 through which the loop 42 is adapted to extend. A pair of concentrically arranged bayonet slots 72 defining an enlarged opening 74 and restriction 76 are provided in the top 68 for detachably anchoring the load cell 32 thereto.

Accordingly, the load cell 32 includes a housing 77 having a cover 78 and base 79 suitably attached there which has a pair of mating projecting studs 80 having an enlarged head 82 adapted to be inserted into the slot enlargements 74. When this is done, the load cell 32 need only be rotated to place the studs in the restricted slot portion 76 to latch the heads 82 under the insert top 68. Reversal of this movement will permit the load cell 32 to be detached from the insert 30. Of course, the loop 42 will be engaged with the upper hook end 62 when attaching the load cell 32, and the loop 42 is removed from this hook end 62 when detaching the load cell 32. In order to facilitate this operation, it may be necessary to insert a hand into the canopy 16 by means of one of glove assemblies 22 and 24 to grasp the hook 54 and manipulate it relative to the loop 42. The housing 77 also serves to mount the beam 38 in a cantilevered fashion as well as the electrically coupled connector 84 which is adapted to receive the jack 34.

A battery operated readout 36 is electrically connected with the jack 34 by lead 86. A suitable dial 88 may appear on the front face of the readout to indicate the weight of the body placed on the harness 28.

In FIG. 8, an exemplary and somewhat simplified version of circuitry is shown whereby the readout 36 may indicate the weight of the body in the harness 28 through the transducer 40. Thus, a bridge-type circuit 90 includes the strain sensitive resistances provided by the piezo resistive crystals 40a and 40b as well as the balancing resistors 92 and 94. The piezo resistive crystals 40a and 40b are bonded to the beam 38. The electrical resistive characteristics of the crystals are such as to vary with the strain to which the crystals are subjected and hence will vary as the beam 38 is deflected by a weight attached thereto since such deflection will impart a strain on the crystals. The battery 96 of the readout 36 is connected in circuit across these balancing resistors as shown. The meter movement 88 of the readout is extended from the junction of the balancing resistors 92 and 94 and both strain resistances 40a and 40b. In this manner, deflection of the beam 38 incident to placement of a weight on harness 28 will be reflected in a proportional movement on scale 88.

Figure 1:
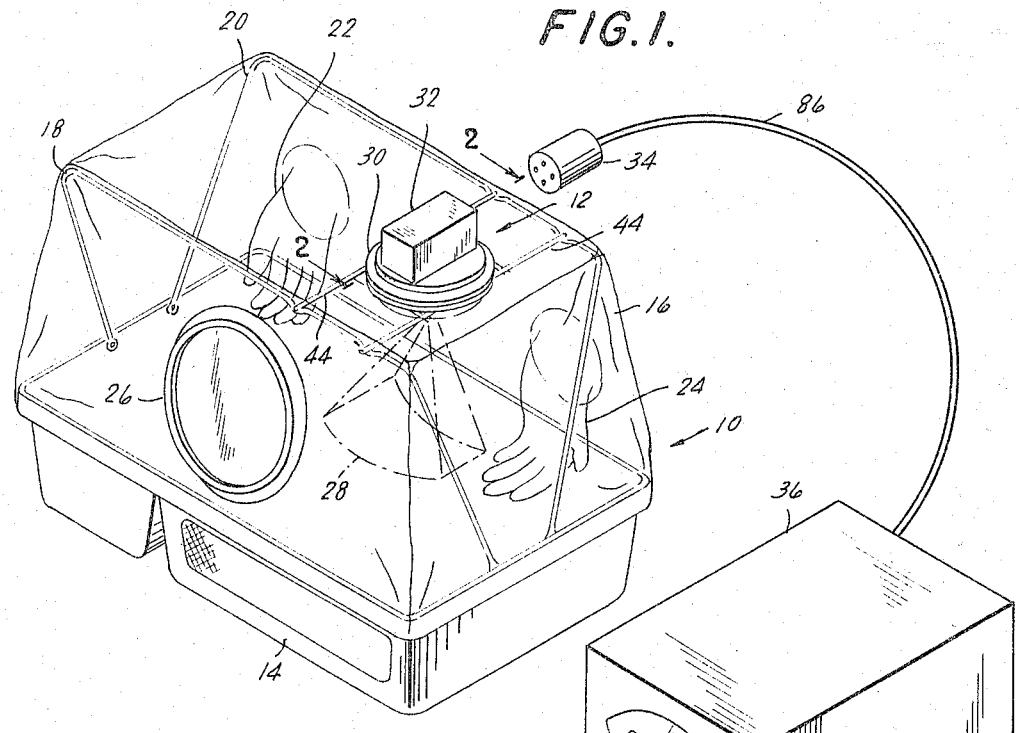
FIG. 1 is a perspective view of a disposable controlled environmental glove isolator having associated therewith a precision remote reading weighing system in accordance with the teachings of this invention.
Figure 2:
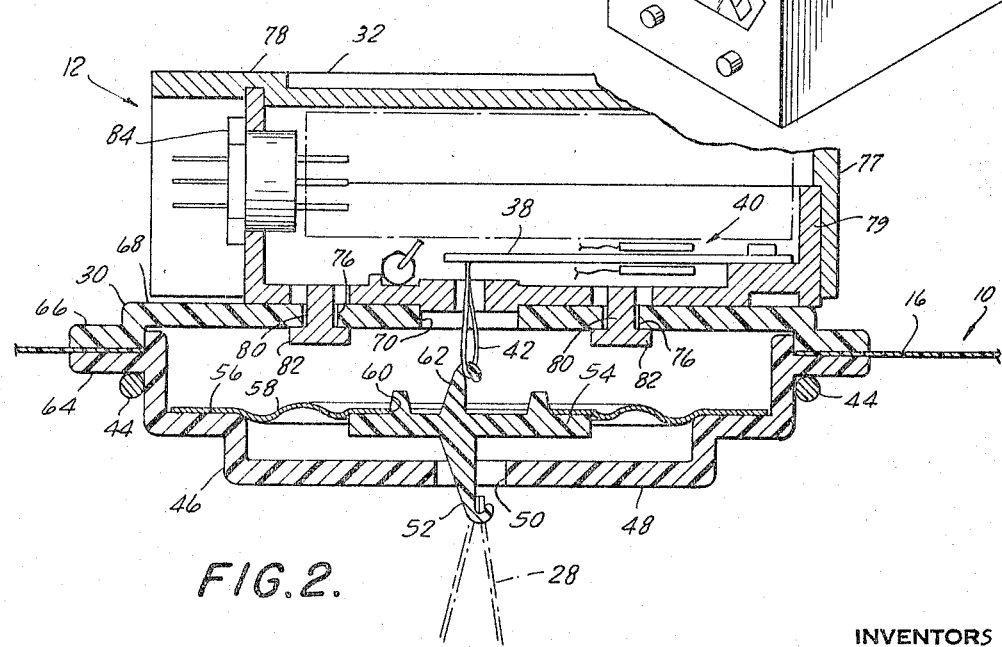
FIG. 2 is an enlarged sectional view taken along the line 2—2 of FIG. 1 showing the interior of the weigh head insert and manner in which the weighing harness is coupled with the deflection beam of the load cell.
Figure 3:
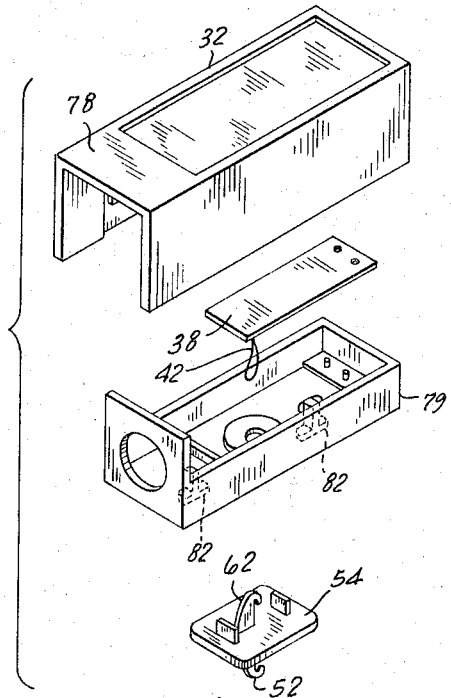
FIG. 3 is an exploded perspective view of the load cell in which a deflection beam and bonded piezo resistance strain gauge transducer is employed.
Figure 4:
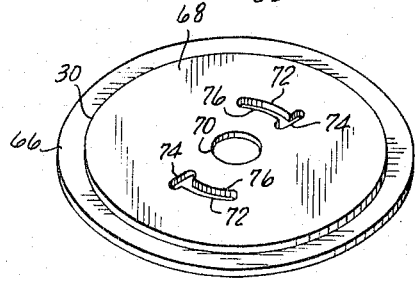
FIG. 4 is an exploded perspective view of the force movement weight head insert contemplated herein.
Figure 4:
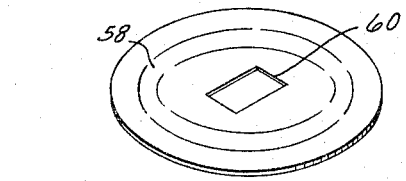
Figure 4:
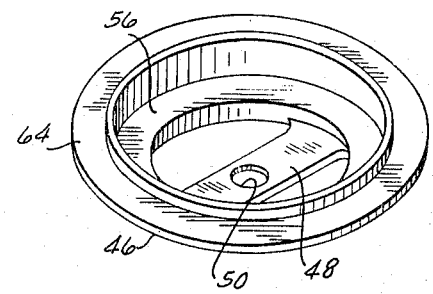
Figure 5:
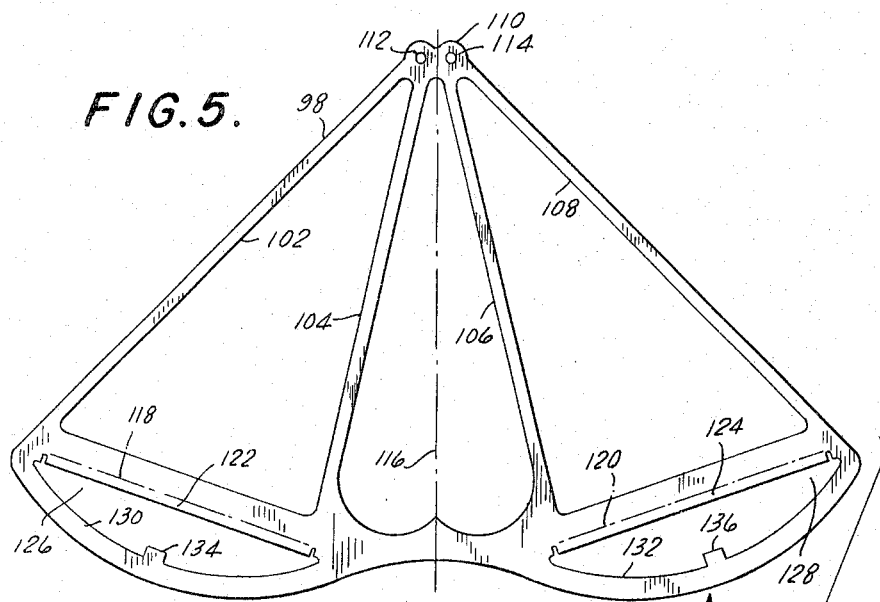
FIG. 5 is an elevational view of stamped parts for one form of weighing pan or harness usable with the isolator.
Figure 6:
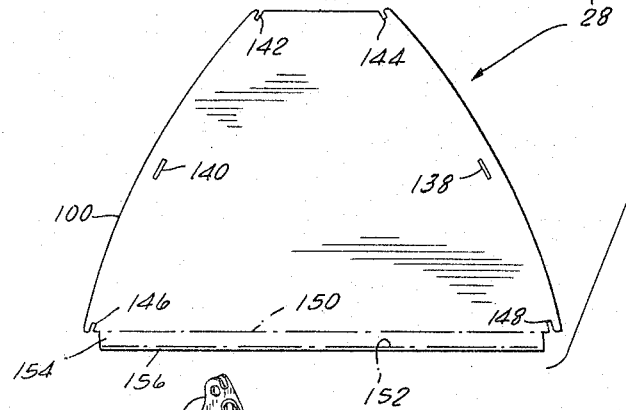
FIG. 6 is a perspective view of these parts folded and assembled to form the harness having particular application in weighing mice.
Figure 6:
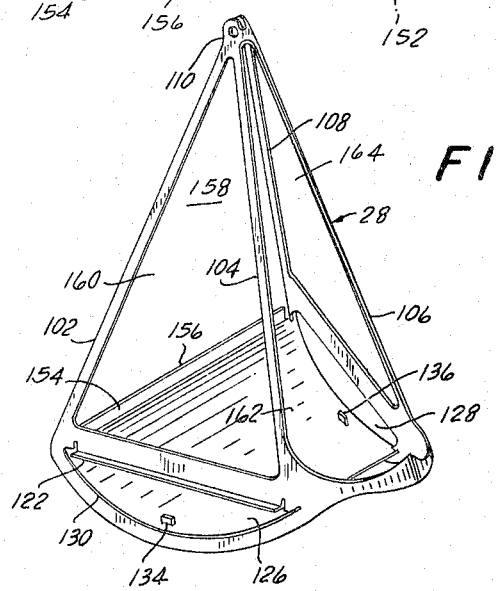

Reference is now made to FIGS. 5 and 6 wherein a harness or weighing pan 28 is adapted to weigh larger bodies such as mice and the like. In the disclosed exemplary embodiment of harness 28 of these figures, a two-piece construction is employed in which a top member 98 and bottom member 100 may be initially stamped from a sheet of low cost resin such as Mylar or the like assembled and then discarded with the isolator 10. It must be understood that a one-piece harness construction is also contemplated by this invention. The top member 98 is essentially flat before assembly with the bottom member and assumes an essentially pyramidal configuration when so assembled. Thus, legs 102, 104, 106 and 108 extend downwardly in a divergent position from a common apex 110 having a pair of openings 112 and 114 adapted to be engaged with the bottom end 52 of the hook 54. The member 98 is folded as shown along fold line 116 and also along liner 118 and 120, the latter serving to produce outwardly projecting flanges 122 and 124, respectively, acting as rigidifying structural members. A pair of recesses 126 and 128 are also present each having a lower curved edge 130 and 132, respectively, on which the bottom member 100 is adapted to rest. Tabs 134 and 136 extend from the respective edges 130 and 132 for engaging with slotted openings 138 and 140 of the bottom member 100 in cooperating to detachably anchor the bottom member in place.

The bottom member 100 is generally trapezoidal in plan with notches 142, 144, 146 and 148 being provided for receiving surfaces of the top member 98 that define the recesses 126 and 128. A pair of folded lines 150 and 152 are provided for permitting the formation of rigidifying flanges 154 and 156.

When assembled or erected and suspended from the hook end 52, the harness 28 is capable of receiving the body or object to be weighed through either of the enlarged side openings 158, 160, 162 or 164. Once the weighing operation has been completed, the weighed body need only be removed through one of these openings.

In FIG. 7, a one-piece harness 166 is proposed and is particularly suited for weighing smaller objects and bodies such as parts of an animal and organs thereof. In this embodiment, a Mylar or other suitable resin sheet may be utilized and from which a central platform 168 is stamped together with convergent arms 170 and 172 and opposing convergent arms 174 and 176. A tongue 178 and accommodating slot 180 operate to connect the arms as shown such that the opening 182 can be engaged with the hook end 52 for suspending the harness 166 for weighing purposes.

It will thus be realized that the several aforenoted objects and advantages are most effectively attained. The disposability of the isolator 10 is maintained but an effective weighing system introduced. The load cell 32, together with the readout 36, may be disconnected from the inset 30 when desired and employed elsewhere, if necessary. The transportability of the isolator 10 is likewise independent of the load cell 32 and readout 34. Accuracy of weighing is assured by permitting the employment of high priced, sensitive and accurate load cells and readouts, the accuracy of which is not materially or detrimentally affected by the discardable nature of the weigh head insert 30 and harness 28.

Although a single preferred embodiment of the invention has been disclosed in detail herein, it should be understood that this invention is in no sense limited thereby but its scope is to be determined by that of the appended claims.

We claim:

1. An isolator with weighing means comprising:
an environmental enclosure having at least one wall with an opening; a member sealed to the enclosure having a force transmission surface extending across said opening;
a weighing pan means within the enclosure for receiving the object to be weighed;
a readout means exterior of the enclosure for registering the weight of the object to be weighed on the pan means; and
means for detachably interconnecting the weighing pan means and readout means through the member in such manner as to prevent leakage into said environmental enclosure from the surrounding atmosphere.

2. An isolator with weighing means comprising:
an environmental enclosure having at least one wall with an opening; a member sealed to the enclosure having a force transmission surface extending across said opening;
a weighing pan means within the enclosure for receiving the object to be weighed;
load receiving means exteriorly of the enclosure for receiving the forces of weighing and cooperating in registering the weight of the object weighed; and
means for detachably interconnecting the weighing pan means and load receiving means through the member; said load receiving means cooperating with said weighing pan means in registering the weight of the object weighed.

3. An isolator having means for taking a measurement therein comprising:
a canopy defining an interior compartment and having an opening;
a substantially air-impervious measuring head insert extending across said opening forming an integral part of said canopy and being hermetically sealed therewith;
means for coupling the insert to an interior measurement taking means; and
means for coupling the insert to a readout for registering the measurement taken without disturbing the environmental conditions within said interior compartment.

4. An isolator having means for weighing objects therein comprising:
an enclosure having an opening;
substantially air-impervious weighing head insert forming a part of said enclosure extending across said opening and being adapted to transmit forces through the enclosure from the interior to the exterior of the enclosure;
means for coupling the insert to a weighing pan for supporting the object to be weighed; and
means for coupling the insert to a readout for registering weight proportional to the forces without disturbing the environmental conditions within said enclosure.

5. A disposable isolator having means for weighing objects therein comprising:
a canopy defining an interior compartment and having an opening;
a discardable substantially air-impervious weighing head insert extending across said opening forming an integral part of said canopy and being hermetically sealed therewithin;
said insert having a flexible and movable diaphram in close proximity to and extending substantially across and being disposed in a plane substantially parallel to adjacent surfaces of the canopy and being adapted to transmit forces through the canopy from the interior to the exterior of the canopy without disturbing the environment within said interior compartment;
means for coupling the insert to a weighing pan for supporting the object to be weighed; and
means for coupling the insert to a readout for registering weight proportional to the forces.

6. An isolator with weighing means comprising:
an enclosure;
a weighing head insert forming a part of said enclosure and being adapted to transmit tensile forces through the enclosure from the interior to the exterior of the enclosure without disturbing the environmental conditions within the enclosure;
a weighing pan within the enclosure suspended from the insert and being adapted to receive the object to be weighted;
an externally mounted load cell detachably coupled with the insert and being operable to generate an electrical signal upon sensing the tensile force transmitted thereto by the insert as a result of the object to be weighed being placed on the harness, said signal being proportional to the weight of the object; and
an electrical readout coupled with the load cell for receiving the electrical signal and registering the weight of the object.

7. A disposable animal isolator with integrated weighing means for facilitating weighing within the isolator comprising:
a canopy defining an interior compartment;
a discardable weighing head insert forming an integral part of said canopy and being hermetically sealed therewith, said insert being adapted to transmit tensile forces through the canopy from the interior compartment to the exterior of the canopy;
a discardable weighing harness within said interior compartment suspended from said insert and being adapted to receive the object to be weighed;
a reusable externally mounted load cell detachably connected with said insert and being operable to generate an electrical signal upon sensing tensile forces transmitted thereto by the insert as a result of the object to be weighed being placed on the harness, said signal being proportional to the weight of the object; and a reusable electrical readout electrically connetced with the load cell for receiving the electrical signal and registering the weight of the object.

8. The invention in accordance with claim 7 wherein the isolator includes a compartmented tray to which the canopy is secured, the tray adapted to receive animals, food and bedding therefor, and said canopy having at least one glove and sleeve assembly for handling objects within the isolator.

9. The invention in accordance with claim 8 wherein said tray includes filter means for cooperating to control the internal atmosphere within the isolator.

10. The invention in accordance with claim 9 wherein said canopy is provided with a sealed transfer port for transferring objects into and out of the isolator while maintaining the controlled environment therein.

11. The invention in accordance with claim 7 wherein a wire frame forms part of said isolator for supporting the canopy in an erected position, a detachable insert support means supported by the frame for supporting the weighing head insert.

12. The invention in accordance with claim 7 wherein said insert comprises a base member sealed to the canopy and having a central opening, a top member sealed to the canopy and having a central opening, a flexible diaphragm sealed to one of the members and having a hook means for engaging with the harness and the load cell and mechanically transmit the tensile forces therebetween and through the central openings.

13. The invention in accordance with claim 7 wherein the insert and cell have mutually complementary surfaces which are projected and slotted for defining detachable connecting means. said connecting means being such as to permit the load cell to be coupled and disconnected with the insert as well as the harness.

14. The invention in accordance with claim 7 wherein the load cell comprises a housing and a cantilevered deflection beam mounted therein with its free end coupled with the harness to receive the tensile forces, and a bonded piezo resistance strain gauge transducer coupled with the beam to transform beam deflection into a proportionate electrical signal.

15. The invention in accordance with claim 7 wherein the readout and load cell are interconnected electrically through an electrical lead with a jack type connection being located at the junction of the lead and load cell.

16. The invention in accordance with claim 7 wherein the readout is battery operated.

17. The invention in accordance with claim 7 wherein said harness comprises a one-piece disposable sheet member bent into a harness configuration comprising a base and a plurality of spaced legs having one end extending from the base and with the other ends joined and connected with the insert.

18. The invention in accordance with claim 7 wherein said harness is disposable and comprises a base of sheet material and another sheet bent into supporting engagement with the base and having a plurality of spaced legs joined at one end and connected with the insert.

References Cited by the Examiner

UNITED STATES PATENTS

| | | | |
|---|---|---|---|
| 2,069,499 | 2/1937 | Marin | 177—132 X |
| 2,598,532 | 5/1952 | Gibbon | 177—245 X |
| 2,614,825 | 10/1952 | Kadlec | 177—181 |
| 2,616,683 | 11/1952 | Le Fevre | 177—211 |
| 3,166,136 | 1/1965 | Coffman | 177—132 |

RICHARD B. WILKINSON, *Primary Examiner.*

GEORGE H. MILLER, JR., *Assistant Examiner.*